United States Patent [19]

Baitinger et al.

[11] 3,875,426

[45] Apr. 1, 1975

[54] LOGICALLY CONTROLLED INVERTER

[75] Inventors: Otz Baitinger, Stuttgart; Werner Haug, Boeblingen, both of Germany

[73] Assignee: International Business Machines Corporation, Armonk, N.Y.

[22] Filed: June 15, 1972

[21] Appl. No.: 263,017

[30] Foreign Application Priority Data

June 26, 1971 Germany ............................ 2131939

[52] U.S. Cl. ................. 307/205, 307/214, 307/215, 307/270

[51] Int. Cl. ... H03k 19/08, H03k 19/40, H03k 19/34, H03k 19/36

[58] Field of Search ........... 307/214, 221, 251, 279, 307/304, 205, 215, 261, 270, 238

[56] References Cited

UNITED STATES PATENTS

| | | | |
|---|---|---|---|
| 3,393,325 | 7/1968 | Borror | 307/205 |
| 3,479,523 | 11/1969 | Pleskko | 307/205 |
| 3,509,363 | 4/1970 | Jen | 307/214 |
| 3,582,683 | 6/1971 | Podraza | 307/251 |
| 3,604,952 | 9/1971 | Recitz | 307/251 |
| 3,614,467 | 10/1971 | Tu | 307/214 |
| 3,628,053 | 12/1971 | Weiss | 307/214 |
| 3,651,334 | 3/1972 | Thompson | 307/205 |
| 3,653,034 | 3/1972 | Recitz | 307/205 |
| 3,660,678 | 5/1972 | Maley | 307/214 |
| 3,678,293 | 7/1972 | Popper | 307/214 |
| 3,702,926 | 11/1972 | Picciano | 307/205 X |
| 3,710,271 | 1/1973 | Putman | 307/205 |
| 3,745,370 | 7/1973 | Kjar | 307/205 |

OTHER PUBLICATIONS

Ruoff "FET Logic Circuits" IBM Tech. Disclosure Bull., Vol. 7, No. 3, Aug. 1964 pp. 265–266.

Baitinger "FET Decoder" IBM Tech. Disclosure Bull., Vol. 15, No. 1, June 72, pp. 234–235

Saffir "Getting More Speed From MOS" Electronics Feb. 17, 1969, pp. 106–112

Wrona "Switching Circuit" IBM Tech. Disclosure Bulletin, Vol. 8, No. 9, Feb. 1966, Page 1301.

*Primary Examiner*—Michael J. Lynch
*Assistant Examiner*—L. N. Anagnos
*Attorney, Agent, or Firm*—Theodore E. Galanthay

[57] ABSTRACT

Disclosed is an inverter circuit consisting of a first field-effect transistor connected in series to a capacitive load and a second field-effect transistor connected in parallel to said load, whereby charging and discharging of the capacitive load are effected via the first and second field-effect transistor, respectively, and a defined potential is applied to the capacitive load via a third field-effect transistor when the first field-effect transistor is inhibited.

7 Claims, 7 Drawing Figures

LOGICALLY CONTROLLED INVERTER

BACKGROUND OF THE INVENTION

1. Field of the Invention

The invention relates to a logically controlled inverter consisting of a first field-effect transistor connected in series to a capacitive load and a second field-effect transistor connected in parallel to said load, whereby charging and discharging of the capacitive load are effected via the first and second field-effect transistor, respectively, by applying suitable gate potentials.

2. Description of the Prior Art

Inverters of this kind are frequently used as the basic element in computer logic circuits. Attention is drawn in particular to NAND and NOR circuits as are employed as decoders in monolithic storages. These applications call for low power dissipation and high d.c. stability. For this purpose the outputs of the inverters or the logic circuits comprising inverters are connected to the selection circuits of the storage cells, namely to the word lines of the storage matrices. For each selection the word lines representing a capacitive load have to be charged. This necessitates that charging be carried out very rapidly, in order to minimize the access times.

There are a great number of known inverters consisting of two transistors connected in series, with a capacitive load connected to the common point being charged and discharged via one and the other transistor, respectively. Such inverters, in addition to assuring a relatively low power dissipation, have a very low output impedance, so that they are particularly suitable for driving capacitive loads. As will be explained hereafter, however, these circuits have the disadvantage that the potential on the output is undefined as a function of the preceding switching state, and that NOR decoders for controlling storage matrices, which are made up of inverters with series-connected transistors, entail problems with respect to the time sequence of the triggering pulses.

Of the great number of known or previously proposed inverters or field-effect transistor logic circuits comprising such inverters it is desired to choose an embodiment which solves the problem of high operating voltages. High operating voltages are undesirable for many reasons, one reason being that power dissipation is effected by the value of the operating voltage, so that only a limited number of such logic circuits can be accommodated in a given area of a monolithic semiconductor substrate. In addition, the cost for the current supply source rises as the voltage to be supplied increases. For these and other reasons the operating voltages of such circuits should be minimized. One prior art embodiment consists in the capacitive load not being directly connected to the output of such a NOR circuit, the output being rather linked with the gate of an additional field-effect transistor whose source is connected to the capacitive load. A further feature of this circuit consists in the gate being connected to the source via an additional capacity. This capacity is charged to make the additional field-effect transistor conductive and discharged to make it non-conductive. After the operative state of the field-effect transistor has been determined by charging or discharging the capacity, the drain of the transistor receives a pulse which is subsequently transmitted, via the field-effect transistor, to the capacitive load or is not transmitted, depending upon whether the transistor is conductive or non-conductive. When the capacity is charged and the field-effect transistor is conductive, the potential on the source is increased, since a voltage drop occurs across the capacitive load. Owing to the feed-back from the source to the gate of the transistor resulting from the additional capacity, the gate potential is also increased. That means the gate/source voltage remains above the operating threshold, with said pulse being transferred, irrespective of whether the initial potential supplied by the output of the NOR circuit to the gate of the transistor and thus the gate/source voltage are relatively low or not. As this voltage determining the operative state of the transistor essentially corresponds to the operating voltage, it can be chosen relatively low. This typical a.c. operated NOR circuit has the disadvantage that alternately with the pulse representing a higher address and applied to the additional transistor a restoring pulse must be used, by means of which the capacity is charged and the transistor is made conductive. That means that the additional pulse representing a higher address can only be transferred to the capacitive load via the transistor after a certain delay. For these reasons very stringent requirements have to be met with regard to the time sequence of the individual pulses. Apart from this, the transistors of the decoders must have a low resistance in the conductive state, so that the required delay does not result in the selection process being slowed down. That leads to the time sequence requirements becoming even more stringent, since in the interest of low power dissipation it must be prevented that all field-effect transistors of the circuit are simultaneously conductive.

SUMMARY OF THE INVENTION

It is an object of the invention to provide a logically controlled inverter which requires very little space when being manufactured in integrated technology and which has low power dissipation.

It is another object of the invention that the switching times of the inverter must be as short as possible and be kept constant by means of defined output levels.

It is a further object of this invention to provide an inverter for use in logic circuits which are particularly suitable for accessing monolithic matrix storages, without the time sequence of higher addresses (chip selection) and of lower addresses (cell selection) having to be considered.

To this end, the invention uses a logically controlled inverter consisting of a first field-effect transistor connected in series to a capacitive load and a second field-effect transistor connected in parallel to said load, whereby charging and discharging of the capacitive load are effected via the first and second field-effect transistor, respectively, by applying suitable gate potentials, characterized in that a third field-effect transistor is linked in series to the capacitive load, whose gate potential is tapped on a resistor connecting the first field-effect transistor to the operating voltage and which is conductive when the first field-effect transistor is inhibited, thus applying a defined potential it receives to the capacitive load. The switching times are additionally reduced by a capacity being arranged parallel to the first field-effect transistor to dynamically operate the inverter. A preferred embodiment is characterized in that the third field-effect transistor applies the gate potential of the first field-effect transistor to the capacitive load. Special embodiments which are particularly suitable for monolithic technology are characterized in that the resistor consists of a high-resistance fourth field-effect transistor, with the gate and drain of the fourth transistor being preferably connected to the operating voltage.

Further preferred embodiments are characterized in that the inverter is designed as a NOR circuit in which parallel to the second field-effect transistor further correspondingly controllable field-effect transistors are arranged, or in that the inverter is designed as a NAND circuit comprising several correspondingly controllable series-connected second field-effect transistors arranged in parallel to the capacitive load.

The foregoing and other objects, features and advantages of the invention will be apparent from the following more particular description of the invention as illustrated in the accompanying drawings.

DESCRIPTION OF THE PREFERRED EMBODIMENTS

Figure 2:
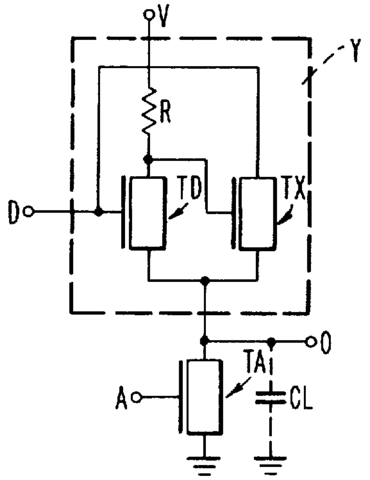
FIG. 2 is an FET inverter circuit in accordance with the present invention.

The logically controlled inverter in accordance with the invention, as shown in FIG. 2, essentially consists of field-effect transistors. Two series-connected transistors TD and TA are connected to an operating voltage source V via a load resistor R. The common point of the transistors consisting of the source of transistor TD and the drain of transistor TA is linked with the source of a further transistor TX, whose drain is connected to the gate of transistor TD. The controllable inputs of the inverter are designated as A and D. Input D is connected to the gate of transistor TD, while input A is linked with the gate of transistor TA. The gate of transistor TX is connected to the drain of transistor TD. The common point of transistors TD and TA forms the output 0 of the inverter. The capacitive load to be driven via output 0 is designated as CL. In comparison with known inverters, the circuit in accordance with the invention comprises a circuit part Y including the transistors TD, TX and resistor R. This circuit part or element is marked by dotted lines in FIG. 2 and correspondingly designated in the remaining embodiments. Instead of the circuit element Y, known inverters essentially comprise a field-effect transistor connected in series to transistor TA, whose gate is linked with control input D.

Owing to the type of field-effect transistors used the potentials and polarities of the operating and control voltages are so determined that in the original state when no signals are applied to inputs A and D transistors TA and TD are inhibited, while transistor TX is conductive. In this state the defined potential on input D is applied, via transistor TX, to output 0. A signal on input D causes transistor TD to be made conductive and transistor TX to be inhibited. That means that the capacity CL on output 0 is charged to the potential of operating voltage source V via transistor TD. A signal on input A causes transistor TA to be made conductive, with capacity CL on output 0 being discharged via this transistor.

This function is subsequently described in detail by means of the NOR circuit (FIG. 3) comprising the inverter (FIG. 2) in accordance with the invention. This NOR circuit consists of the inverter in accordance with the invention, in which two further transistors TB and TC with inputs B and C are, for example, arranged in parallel to transistor TA with input A. It is assumed that the NOR circuit is used to realize the logic function $o = \overline{\overline{d} + a + b + c}$ which can also be expressed as $o = d \cdot \overline{a} \cdot \overline{b} \cdot \overline{c}$, where the signals are to be applied to the inputs marked by capital letters are designated by the corresponding small letters. The NOR circuit in accordance with the invention only supplies an output signal $o$ when signal $d$ is present, while signals $a$, $b$, and $c$ are absent. Thus signal $d$ is superposed on the latter signals.

An embodiment of this NOR circuit serving as a decoder for accessing monolithic storages is subsequently described in detail..

First of all, the operation of the NOR circuit is described by means of the different switching states, that means with the various input conditions being taken into account.

When a signal $d$ is applied to input D, transistor TD is conductive, while transistor TX is inhibited. Signal $\overline{d}$ on input D indicates that transistor TD is inhibited, whereas transistor TX is conductive. With regard to inputs A, B, and C, signals $a$, $b$, $c$ cause the respective transistors TA, TB, TC to be made conductive, whereas the negated signals $\overline{a}$, $\overline{b}$, $\overline{c}$ cause these transistors to be inhibited.

In the following a first state is assumed in which signals $\overline{d}$, $\overline{a}$, $\overline{b}$, and $\overline{c}$ are present, so that signal $\overline{o}$ appears on the output and transistors TD, TA, TB, TC are inhibited while transistor TX is conductive. Thus a short discharge current flows, via transistor TX, from the capacitive load CL to input D. As there are no resistors in this current path, the discharge time is extremely short. After discharge, the current ceases to flow, so that the power consumption of the circuit in this state is at a minimum.

In the second case it is assumed that signals $\overline{d}$, $a$, $b$, and $c$ are present, that means signal $\overline{o}$ is again applied to the output. According to the NOR function of the circuit, it is implied in this case that only only or two of the signals $a$, $b$, and $c$ occur. Transistor TD is again inhibited, while transistor TX is conductive, but transistors TA, TB, and TC or at least one or two of them are additionally conductive. A short discharge current flows across transistor TX and additionally across the conductive transistor or transistors TA, TB, and TC. In this case both the discharge time and the power consumption are at a minimum.

In a third case it is assumed that signals $d$, $a$, $b$, and $c$ are present, that means signal $\bar{o}$ again appears on the output, and transistors TD, TA, TB, and TC are conductive. According to the logic function, it is implied in this case that only one of the signals $a$, $b$ or $c$ is present, so that only one of the transistors TA, TB or TC is conductive. In this case, too, a short discharge current flows across the capacitive load CL and the conductive transistor or transistors TA, TB, and TC. As the resistance in the current path is negligible, this discharge current flows for only a short time. In this switching state there is, however, a permanent direct current flowing from voltage source V to ground via resistor R, transistor TD and via the conductive transistor or transistors of group TA, TB, and TC. As in the former two cases, the power consumption, which is essentially a function of operating voltage V and resistor R is again low.

In the fourth case, which corresponds to the only switching state in which the signal $o$ occurs on the output, it is assumed that signals $d$, $\bar{a}$, $\bar{b}$, and $\bar{c}$ are present on the corresponding inputs. Thus only transistor TD is conductive, and charge current flows, via resistor R and transistor TD, from operating voltage source V to capacitive load CL. As this charge current flows for only a short time, the power consumption is correspondingly low.

It will be seen from these details that merely in the third case or in the switching state corresponding to this case there is a permanent power consumption as a result of the d.c. flow. Apart from this, this circuit in accordance with the invention has the advantage of being suitable for extremely short switching times, and low power consumption.

Figure 1:
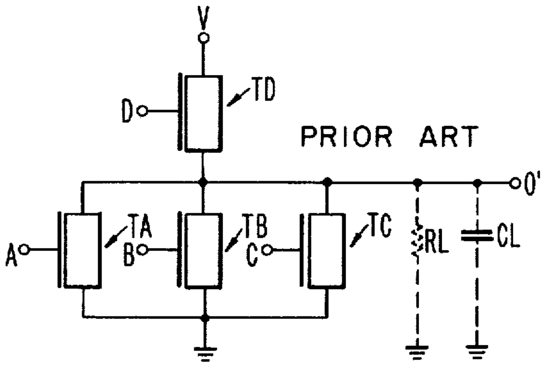
FIG. 1 is an FET NOR logic inverter circuit known in the prior art.

The following is a description of the application of the NOR circuit for storage addressing in accordance with the invention and of its advantages (FIGS. 4 and 5) over the known NOR circuit of FIG. 1.

Figure 4:
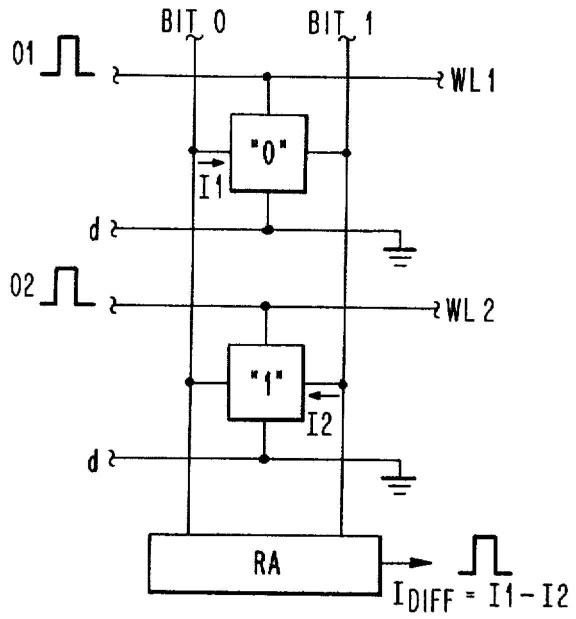
FIG. 4 is a block diagram of a section of a storage matrix addressed by means of NOR circuits designed as decoders.
Figure 5:
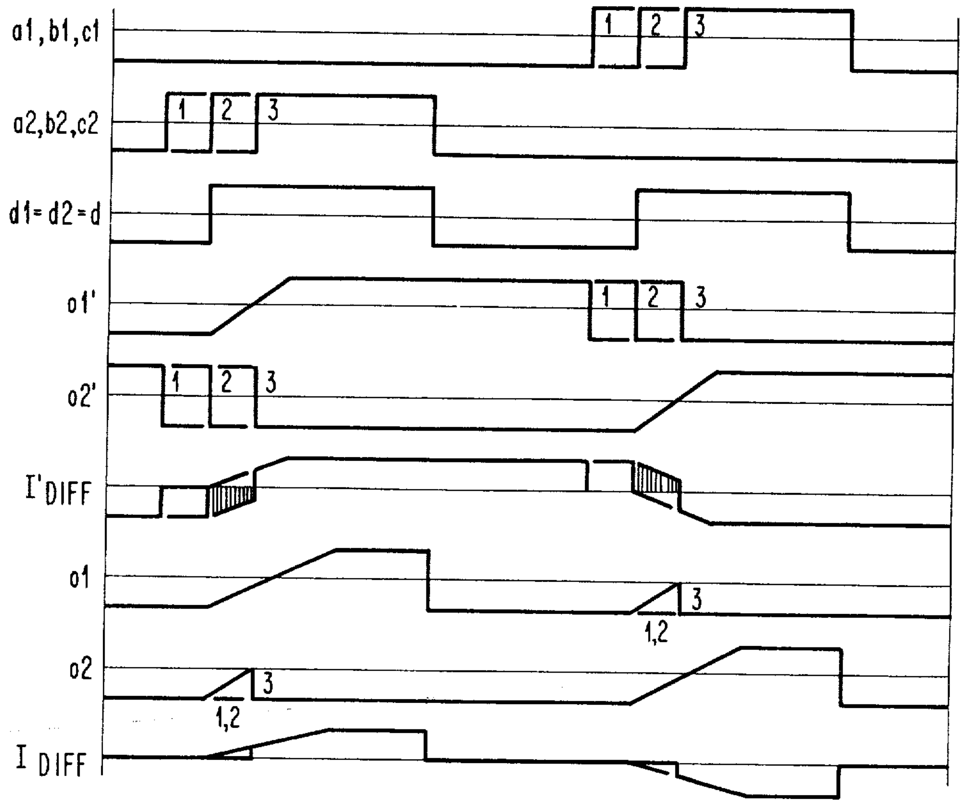
FIG. 5 is a waveform diagram illustrating the time sequence of individual addresses and of the selection pulses and read signals derived from them in the NOR decoder circuits.

It is helpful to first consider the operation of the prior art circuit of FIG. 1. The simple d.c. stable NOR decoder of FIG. 1 consists of a series-connected transistor TD and of parallel-connected transistors TA, TB, and TC. The capacitive load CL with a parallel resistor RL is connected in parallel to transistors TA, TB, and TC. The output terminal is designated as 0'. The address signals are applied to inputs A to D linked with the gate electrodes, where $d$ is an address of a higher order, being, for example, responsible for the chip selection in monolithic storage chips. Output signal $o'$ selects, for example, a word line of a storage matrix. A section of such storage matrix is shown in FIG. 4. The two storage cells 0 and 1 are each connected to one word line WL1 or WL2 which are linked with output 01 or 02 of a NOR decoder. The two storage cells are also connected to bit lines BIT 0 and BIT 1 which are periodically connected to the inputs of a differential amplifier used as a read amplifier RA. It is assumed that the storage cells of opposite information content shown in FIG. 4 are successively selected. This is indicated by the time sequence of addresses $a1$, $b1$, $c1$ of the first decoder and by addresses $a2$, $b2$, $c2$ of the second decoder in FIG. 5. It is assumed that the superposed address d is applied jointly to both decoders, that means $d1 = d2 = d$. For storage cell accessing, which is hereafter described in detail, it is assumed that two known decoders according to FIG. 1 are used. During this process, signals $o1'$ and $o2'$ supplied by decoder outputs 01' and 02' appear on word lines WL1 and WL2. FIG. 5 shows that charging of output 01', which is effected via the associated transistor TD, is initiated by the higher address $d$, with transistors TA, TB, and TC of the first decoder being non-conductive. The non-selected output 02' is discharged by means of addresses $a2$, $b$ 2, and $c2$ via the corresponding transistors TA, TB, and TC, whereby power dissipation increases, since all transistors of the second decoder are conductive. If the time sequence of addresses $a$, $b$, and $c$ fluctuates in relation to the higher address $d$, as is indicated by edges 1, 2, and 3, the discharge of the non-selected output 02' is either premature or belated. During reading, a current $I'_{DIFF} = I1 - I2$ occurs on the output of read amplifier RA. The premature occurrence of addresses $a$, $b$, and $c$ in relation to $d$ does not result in erroneous information when the selected cell is read, whereas the belated occurrence of said addresses may lead to erroneous information. Therefore, it is essential for the address time sequence that only edges between 1 and 2, but not between 2 and 3, be permissible. This will be seen from the course of current $I'_{DIFF}$ as shown.

The operation of the decoder of the present invention will now be described. For the subsequent description of a selection process it is assumed that in place of the known decoder of FIG. 1 decoders of FIG. 3 in accordance with the invention are employed for accessing the storage cells of FIG. 4. The output signals of the two decoders are designated as $o1$ and $o2$ and the differential current on the output of the read amplifier RA with $I_{DIFF}$. Selection and reading of the two storage cells are again carried out successively by means of the two NOR decoders in accordance with the invention. The accessing addresses $a1$, $b1$, $c1$ and $a2$, $b2$, $c2$, respectively, are applied to the gate electrodes of the parallel-connected transistors TA, TB, and TC of the two decoders. The higher address $d1 = d2 = d$ is applied to transistors TD. Outputs 01 and 02 of the two decoders are charged via conductive transistors TD in the case of nonconductive transistors TA, TB, and TC. Operation is as follows. A higher address $d$ is set. This causes transistors TD to be made conductive and transistors TX to be made non-conductive. When addresses $\overline{a1}$, $\overline{b1}$ and $\overline{c1}$ are applied, so that transistors TA, TB, and TC of the first decoder are non-conductive, the selecting output 01 can be charged via the appertaining transistor TD, that means signal $o1$ is applied to output 01. When transistors TA, TB or TC of the second decoder are made conductive by addresses $a2$, $b2$ or $c2$, output 02 cannot be charged, irrespective of whether these addresses are set prior to the higher address $d$ (edges 1 to 2) or subsequently (edges 2 to 3), from which it is apparent that no erroneous information is read. The use of the NOR decoder in accordance with the invention does not impose any particular requirements with regard to the time sequence of the pulses. In this way, the signals A and D are time independent.

Although the non-selected decoder has only two conductive transistors (with the exception of transistor TX), its power dissipation is low on account of the high resistance of resistor R.

In comparison with the prior art decoder, the NOR decoder in accordance with the invention has the further advantage that a defined level, address $\bar{d}$, is set on output 0, that means on word line WL in the embodiment described, when there is no selection signal on input D, that means when address $\bar{d}$ is applied via transistor TX which is conductive at that time. That means upon application of addresses $\bar{a}$, $\bar{b}$, and $\bar{c}$ and appearance of address d this defined level changes to a level corresponding to output signal $o$, thus ensuring a switching time independent of the preceding switching state. This does not apply to the prior art decoder of FIG. 1. The level on output 0′ is not defined upon appearance of address $d$, since the capacitive load discharges, via leakage resistor RL, as a function of time and dependent upon the preceding switching state.

Figure 6:
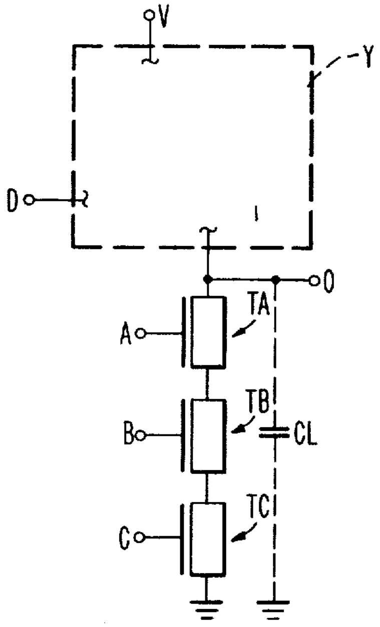
FIG. 6 is an FET NAND circuit incorporating the inverter of FIG. 2 in accordance with the invention.

FIG. 6 shows a further embodiment of the logically controlled inverter of FIG. 2. The essential circuit element Y, corresponding to FIG. 2, characterizing the inverter in accordance with the invention is only shown in block form in FIG. 6. The application refers to a NAND circuit in which, in the embodiment described, three field-effect transistors TA, TB, and TC are connected in series to circuit element Y. The capacitive load C1 is applied to output 0 parallel to these three transistors. The logic inputs are again designated as A to D. The block diagram designation is utilized to emphasize that the present invention broadly encompasses the means plus function of block Y, not necessarily limited to the particular transistor configuration.

Figure 3:
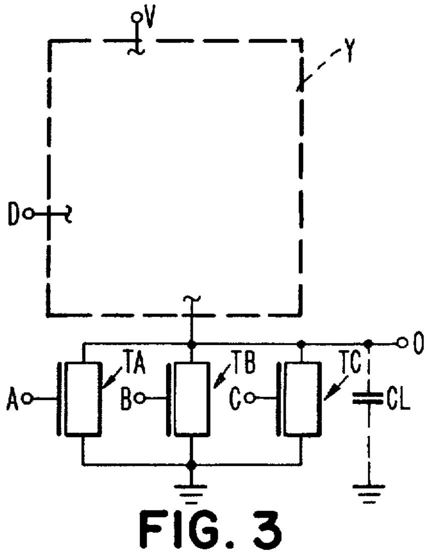
FIG. 3 is an FET NOR circuit incorporating the inverter of FIG. 2 in accordance with the invention.
Figure 7:
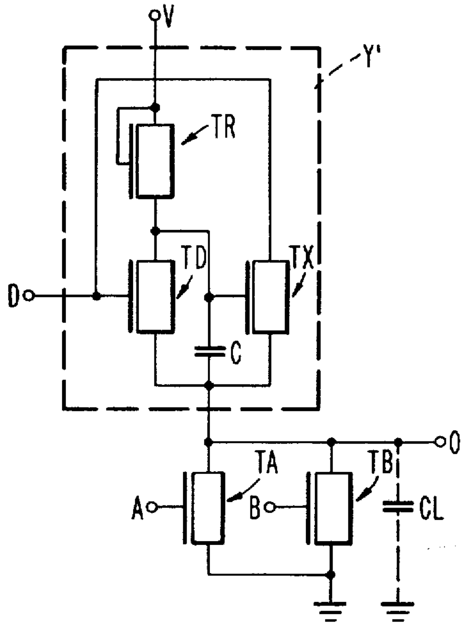
FIG. 7 is still further embodiment of an FET NOR circuit in accordance with the invention, for dynamic operation.

In contrast to FIGS. 2 and 3, FIG. 7 shows an inverter in accordance with the invention and a dynamically operating NOR circuit comprising such an inverter, respectively. The essential circuit element Y′ characterizing the invention corresponds in principle to circuit element Y in FIG. 2. Circuit element Y′ of FIG. 7 differs from the latter element in that a gate/source capacity C is available on field-effect transistor TX. This additional capacity insures that selection, as has been described in connection with FIG. 3, is carried out very rapidly. The NOR circuit of FIG. 7 comprises, for example, two address inputs A and B with associated transistors TA, TB and an input D for a superposed address.

Assuming signal $\bar{o}$ (selection) is generated on output 0, that means that addresses $a$, $b$, and $d$ are available on the corresponding inputs, then transistors TA and TB are inhibited. Transistor TD has only a low conductivity on account of the high threshold voltage resulting from the high output level corresponding to signal $\bar{o}$. Capacity C keeps transistor TX conductive until it (capacitor C) has been slowly discharged via transistor TD. That means that transistor TX, which was conductive before selection, remains conductive during selection, accelerating this process, since output 0 is not only charged from operating voltage source V via resistor R, but also directly from signal source D via transistor TX.

Assuming signal $\bar{o}$ (no selection) is generated on output 0, that means that addresses $a$, $b$, and $d$ are applied to the corresponding inputs, then transistors TA and TB are conductive. Transistor TD has a high conducticity on account of the low threshold voltage resulting from the low output level corresponding to signal $o$. Thus capacity C is rapidly discharged via transistor TD, so that transistor TX is rapidly inhibited.

In the embodiment of FIG. 7 the resistor shown as an ohmic resistor R in the embodiment of FIG 2 is replaced by a high-resistance field-effect transistor TR. This transistor may have a long and narrow shape with a thin gate oxide layer, that means a low threshold voltage and a high transconductance. Where the space available is limited, it is also possible to use the thick oxide layer over a monolithic circuit as a gate oxide, which has the advantage of insuring a high threshold voltage and a low transconductance.

While the invention has been particularly shown and described with reference to the preferred embodiments thereof, it will be understood by those skilled in the art that various changes in form and detail may be made therein without departing from the spirit and scope of the invention.

What is claimed is:

1. A logically controlled inverter circuit comprising:
a capacitive load;
a first field effect transistor connected in series with said capacitive load;
a second field effect transistor connected in parallel with said capacitive load, thereby charging and discharging said capacitive load via said first and second field effect transistor, respectively, by applying suitable gate potentials;
a resistive means connected between said first field effect transistor and a source of potential supply; and
a third field effect transistor connected in series with said capacitive load, and having a gate electrically connected to a point between said resistive means and said first field effect transistor, thereby rendering said third field effect transistor conductive and applying a defined potential to the capacitive load when said first field effect transistor is inhibited;
wherein said third field effect transistor applies the potential at the gate of the first field effect transistor to the capacitive load.

2. A logically controlled inverter circuit as in claim 1, wherein for the dynamic operation of the inverter a capacitance is arranged parallel to said first field effect transistor.

3. A logically controlled inverter circuit as in claim 1 wherein said resistive means comprises a high-resistance fourth field effect transistor.

4. A logically controlled inverter circuit as in claim 3 wherein the gate and drain electrodes of said fourth field effect transistor are connected to said source of potential supply.

5. A logically controlled inverter circuit as in claim 4 comprising additional field effect transistors including at least a fifth field effect transistor arranged in parallel with said second field effect transistor, forming a NOR circuit.

6. A logically controlled inverter circuit as in claim 1 comprising at least one additional field effect transistor connected in series with said second field effect transistor and in parallel with said capacitive load, forming a NAND circuit.

7. A logically controlled inverter circuit comprising:
a capacitive load;
a first field effect transistor connected in series with said capacitive load;
a second field effect transistor connected in parallel with said capacitive load, thereby charging and discharging said capacitive load via said first and second field effect transistor, respectively, by applying suitable gate potentials;
a resistive means connected between said first field effect transistor and a source of potential supply; and
a third field effect transistor connected in series with said capacitive load, and having a gate electrically connected to a point between said resistive means and said first field effect transistor, thereby rendering said third field effect transistor conductive and applying a defined potential to the capacitive load when said first field effect transistor is inhibited;

wherein said resistive means comprises a high-resistance fourth field effect transistor;

wherein the gate and drain electrodes of said fourth field effect transistor are connected to said source of potential supply;

including additional field effect transistors including at least a fifth field effect transistor arranged in parallel with said second field effect transistor, forming a NOR circuit.

* * * * *